No. 711,319. Patented Oct. 14, 1902.
C. B. JACOBS.
OBJECT OF REFRACTORY MATERIAL AND METHOD OF MANUFACTURING SAME.
(Application filed Dec. 26, 1900.)
(No Model.)
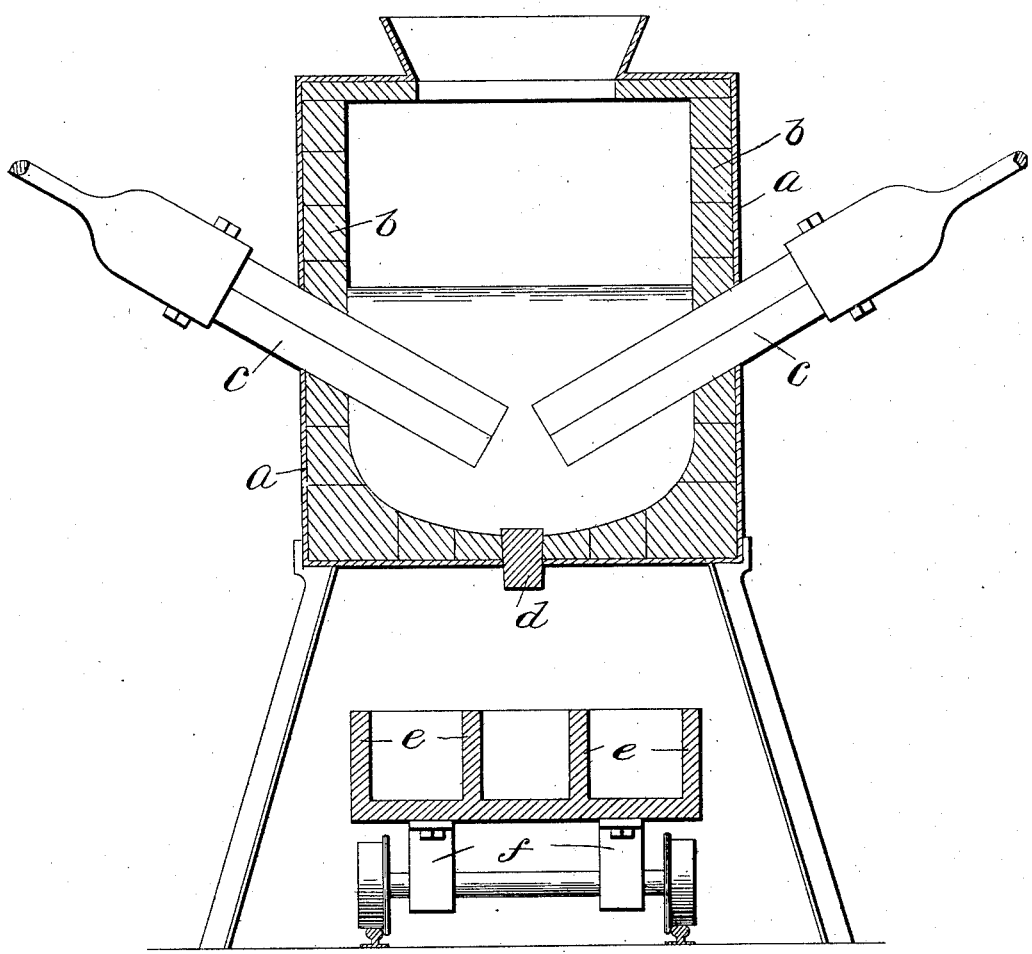
Witnesses.
Inventor.
Charles B. Jacobs

UNITED STATES PATENT OFFICE.

CHARLES B. JACOBS, OF EAST ORANGE, NEW JERSEY, ASSIGNOR, BY MESNE ASSIGNMENTS, TO GEORGE S. ETTLA, OF NIAGARA FALLS, NEW YORK.

OBJECT OF REFRACTORY MATERIAL AND METHOD OF MANUFACTURING SAME.

SPECIFICATION forming part of Letters Patent No. 711,319, dated October 14, 1902.

Application filed December 26, 1900. Serial No. 41,121. (No specimens.)

*To all whom it may concern:*

Be it known that I, CHARLES B. JACOBS, a citizen of the United States, residing at East Orange, county of Essex, State of New Jersey, have invented certain new and useful Improvements in Objects of Refractory Material and in the Methods of Manufacturing the Same, of which the following is a specification.

This invention relates to improvements in bricks or other objects of refractory material and in the method of manufacturing the same; and its object is to provide in a commercial form bricks, tiles, blocks, or other masses of definite shape and of materials such as are not fusible in ordinary furnaces or ovens—for example, silicates of aluminium and similar refractory silicates.

My invention consists in fusing such materials in the electric furnace and casting the melted material into molds of suitable shape to produce blocks or masses of the desired configuration and size. In applying this process to certain materials, such as aluminium silicate, I have found that one effect of the heat is to volatilize a portion of the more volatile constituent, (silica,) leaving a product which is less easily fusible, harder, and tougher than the original material or the product resulting from the baking of same by ordinary processes.

My invention is particularly applicable to the production of molded articles from aluminium silicate, and I will proceed to describe my invention in such application.

The accompanying drawing is a vertical section of an electric furnace suitable for carrying out my invention.

When fire-clay, whose principal constituent is aluminium silicate, is brought to fusion in the electric furnace, a certain proportion of the silicate is volatilized and driven off from the clay. This has the chemical effect of changing the silicate so treated to a lower silicate, or, in other words, of changing the compound to a silicate in which the ratio of the silicic acid to the base is lowered. This chemical change results in or is accompanied by an important change in the physical character of the silicate—namely, increasing its hardness and toughness and decreasing its fusibility. If the original material (fire-clay) be simply fused and without the loss of any of its silica be allowed to cool to solid state, it will present a glossy appearance and be very brittle; but if it be maintained in a fused state for a sufficient time to lose a substantial or appreciable percentage of its silica it will cool to a waxy-looking mass of an extreme degree of toughness and hardness. This product of the fusion of aluminium silicate on account of its hardness and toughness is especially suitable for certain purposes—such as paving-bricks, tiling, water and sewer pipes, building-bricks, and fire-bricks—its comparative infusibility being also of advantage in building and fire bricks.

The process as applied to silicate of aluminium is carried out in the following manner: Fire-clay or kaolin is charged into an electric furnace, a suitable type of which is shown in the drawing, $a$ being the furnace wall or casing, $b$ the refractory lining, $c\ c$ the electrodes, and $d$ the plug closing the tap-hole in or near the bottom of the furnace. Below this tap-hole is arranged means for receiving the melted material—for example, metal molds $e$, carried on truck $f$. The material to be fused is charged into the furnace between the electrodes, and an arc or current having been started between the electrodes in a suitable manner the current is continued until the mass is brought to a state of fusion. In case kaolin or, generally speaking, a refractory silicate is being operated upon I prefer to continue the heating-current for sufficient time to drive off a substantial percentage of the silica present, the same being evolved during such further heating in the form of copious white clouds. Ordinary kaolin $(Al_2O_3 2SiO_2)$ consists of aluminium silicate with an excess of silica—that is to say, the proportion of silica present is greater than would correspond to the normal silicate $(Al_2O_3 SiO_2)$—and by applying sufficient heat or heating for a sufficient time, as above specified, all of this excess of silica may be driven off, leaving the normal silicate. With two hundred pounds of material and a current of about one hundred volts and fifteen hundred amperes (one hundred and fifty kilowatts) it takes about twenty minutes to melt the clay and about forty minutes more to drive off onehalf of the silica, so as to leave the normal silicate. The silica so evolved may also be collected and utilized for various purposes to which finely-divided silica is applicable. Then the tap or plug $d$ is withdrawn and the material allowed to run into the metal molds $e$, when it cools to shape corresponding to that of the mold. The mold being of metal, and therefore heat-conducting or chilling in effect, the first result when the material enters it is to solidify a thin crust or layer of the material in contact with the metal, and then this crust or layer protects the mold from the heat of the still liquid portion of the mass. If ordinary non-metallic silicious molds were used, the material would melt the face of the mold and the two would fuse together into an inseparable mass.

By "refractory material," as herein used, I mean a material which is infusible for purposes of casting in ordinary furnaces.

Having thus described my invention, the following is what I claim as new therein and desire to secure by Letters Patent:

1. The process of manufacturing bricks or other objects of refractory silicious material containing an excess of silica, which consists in fusing such material in the electric furnace, maintaining the material in a state of fusion until a substantial portion of the silica contained in the material is volatilized, and casting the fused product in molds.

2. The process of treating refractory silicious material containing an excess of silica, which consists in fusing such material in the electric furnace, and applying sufficient heat to cause a substantial portion of the silica to be volatilized, and allowing it to cool.

3. The process of treating aluminium silicate containing an excess of silica, which consists of fusing it in the electric furnace, and applying thereto sufficient heat to cause a substantial portion of the silica to be volatilized, and allowing the fused material to cool.

CHARLES B. JACOBS.

Witnesses:
J. GREEN,
A. P. KNIGHT.